United States Patent
Kawagoe et al.

[19]

[11] Patent Number: 5,851,016
[45] Date of Patent: Dec. 22, 1998

[54] REAR WHEEL SUSPENSION

[75] Inventors: Kenji Kawagoe, Yokosuka; Takuya Murakami, Fujisawa; Masaharu Satou, Tokyo; Takaaki Uno, Atsugi; Hideo Aimoto, Zama; Tamiyoshi Kasahara, Fujisawa; Hiroshi Nagaoka, Machida, all of Japan

[73] Assignee: Nissan Motor Co., Ltd., Yokohama, Japan

[21] Appl. No.: 713,764

[22] Filed: Sep. 13, 1996

[30]      Foreign Application Priority Data

Sep. 13, 1995  [JP]  Japan .................................... 7-235615

[51] Int. Cl.⁶ ..................................................... B60G 3/20
[52] U.S. Cl. .............................. 280/124.148; 280/124.15; 280/124.135
[58] Field of Search ..................... 280/690, 701, 280/725, 726, 675, 788, 124.109, 124.135, 124.143, 124.144, 124.145, 124.148, 124.15

[56]             References Cited

U.S. PATENT DOCUMENTS

| 4,444,415 | 4/1984 | von der Ohe | 280/701 |
| 4,840,396 | 6/1989 | Kubo | 280/690 |
| 5,176,398 | 1/1993 | Kanai et al. | 280/670 |

FOREIGN PATENT DOCUMENTS

| 0401547 | 5/1990 | European Pat. Off. | 280/701 |
| 698921 | 12/1965 | Italy | 280/701 |
| 63-0145112 | 6/1988 | Japan | 280/701 |
| 2-249712 | 10/1990 | Japan . | |
| 5085115 | 4/1993 | Japan | 280/690 |

*Primary Examiner*—Stephen M. Johnson
*Attorney, Agent, or Firm*—Foley & Lardner

[57]                 ABSTRACT

A wheel suspension for rear wheels of an automotive vehicle, comprises a coil spring on a rear lateral link having an articulation point on an axle housing, a front lateral link, a radius rod and an upper arm having an articulation point on the axle housing at a position higher than a wheel center. A shock absorber is arranged such that its longitudinal axis crosses the wheel center as viewed the axle housing in a transverse direction with respect to a normal forward driving direction. The upper arm is connected to a suspension member via a forward pivot and a rearward pivot. The arrangement is such that loading the axle housing at the connection point with the upper arm in a rearward direction with respect to the normal forward direction causes the upper arm to position the connection point inwardly with respect to the vehicle body, and loading the axle housing at the connection point in the normal forward direction causes the upper arm to position the connection point outwardly with respect to the vehicle body.

9 Claims, 16 Drawing Sheets

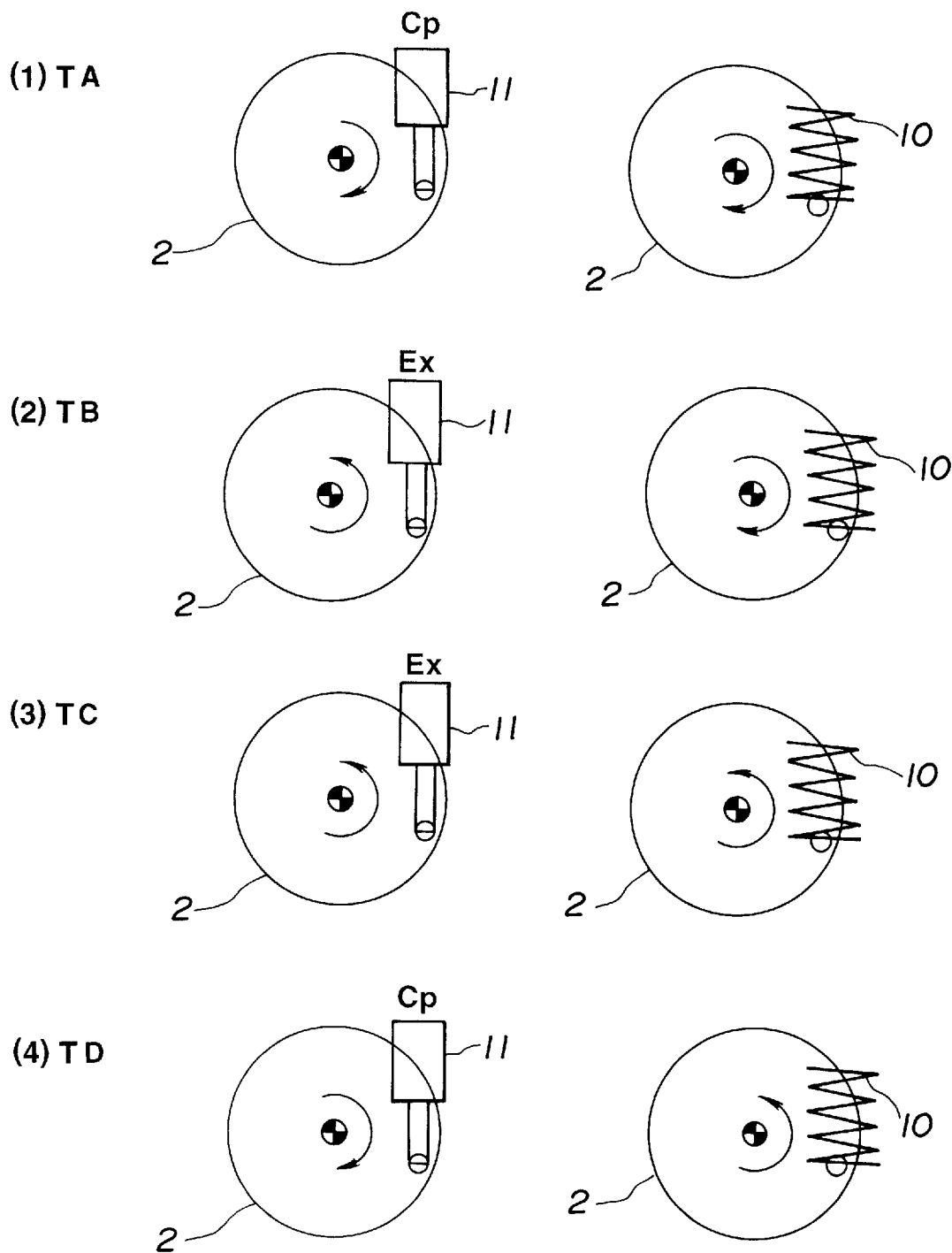

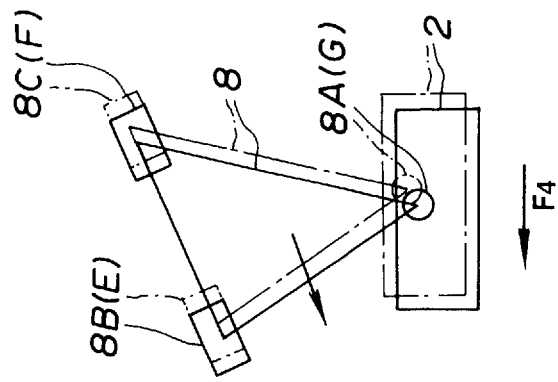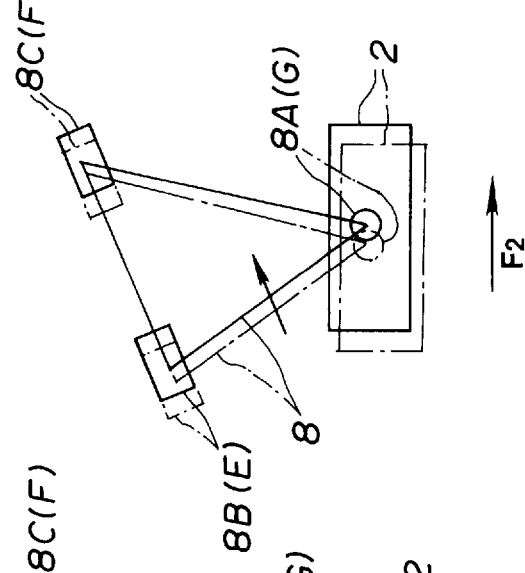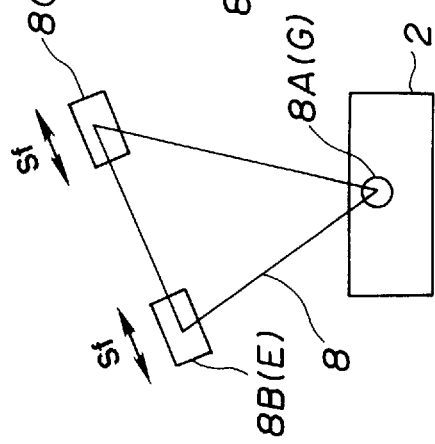

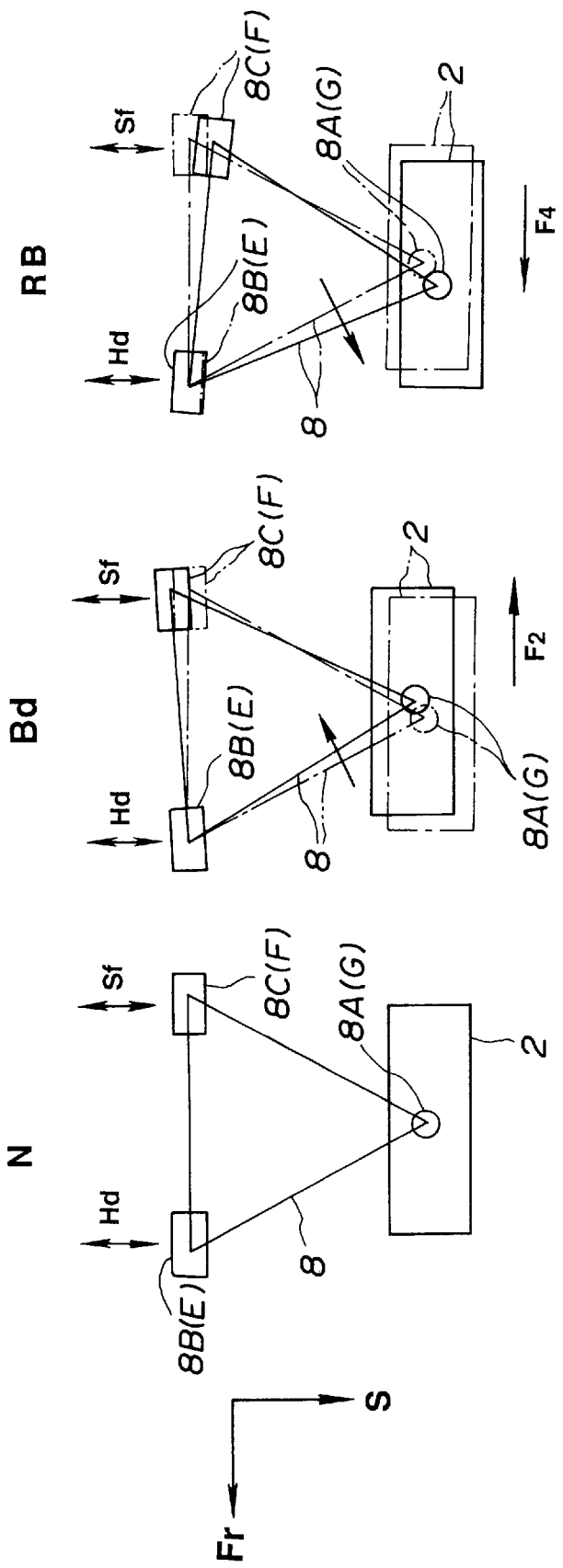

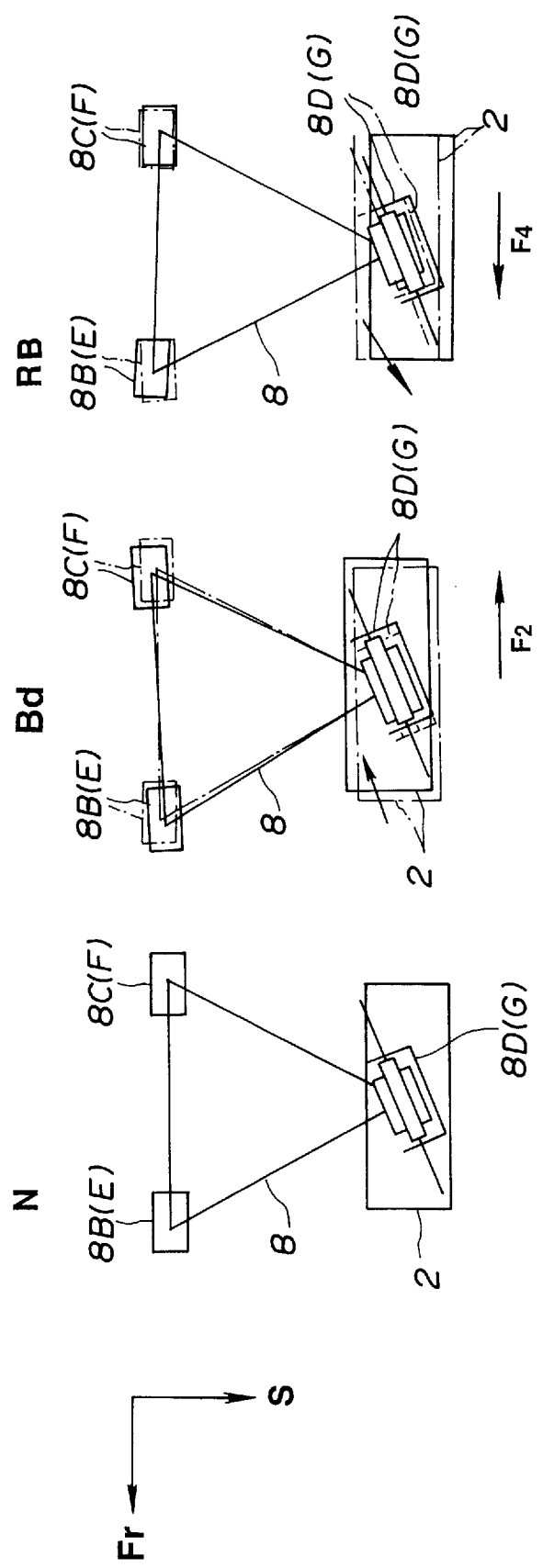

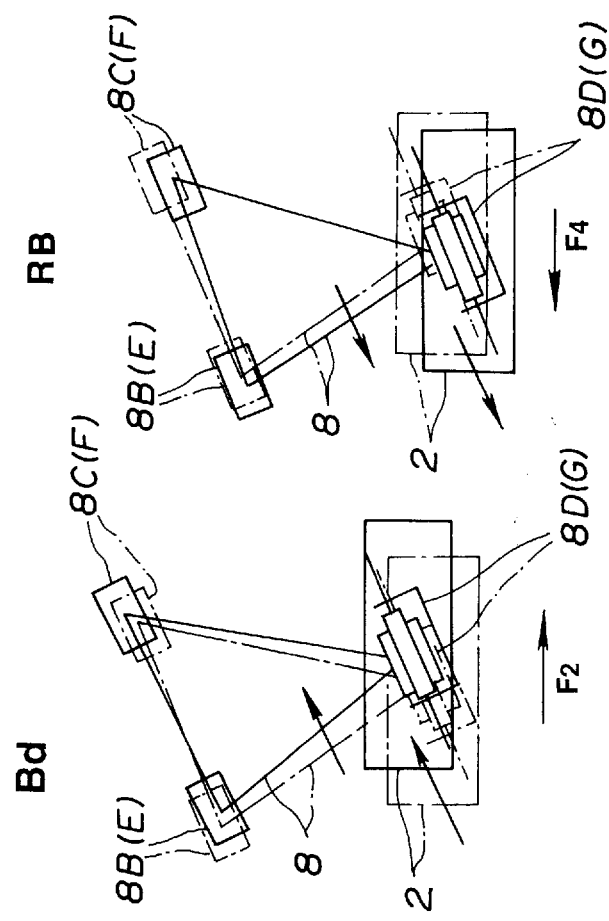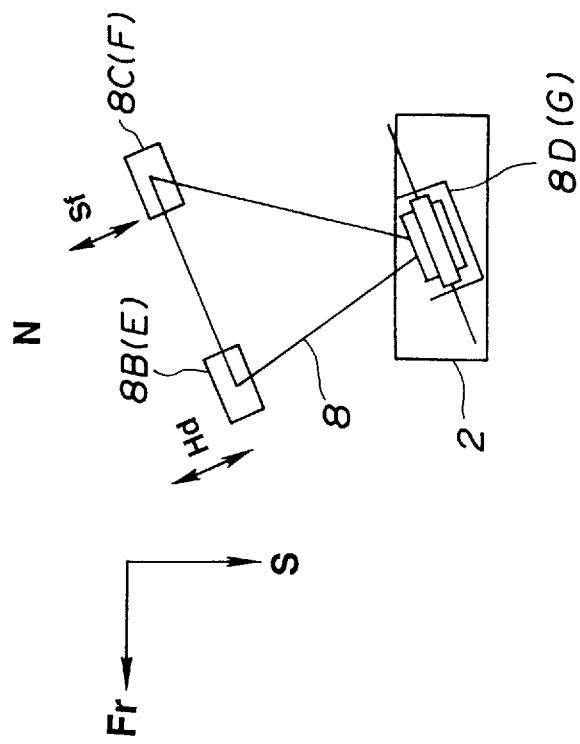

REAR WHEEL SUSPENSION

BACKGROUND OF THE INVENTION

1. Field of the Invention

The present invention relates to a wheel suspension for rear wheels of an automotive vehicle.

2. Description of the Prior Art

Various suspensions have been proposed for rear wheels of an automotive vehicle for improving stability during cornering.

JP-A 2-249712 discloses a wheel suspension of the type wherein a coil spring is mounted around a shock absorber, while U.S. Pat. No. 4,444,415 discloses a wheel suspension of the type wherein a coil spring is separated from a shock absorber.

According to JP-A 2-249712 and U.S. Pat. No. 4,444,415, the known wheel suspensions comprise an axle housing or wheel carrier, a radius rod having an articulation point on the axle housing and extending forwardly and inwardly, a front lateral link extending generally transversely, with respect to the vehicle body, and having an articulation point on the axle housing, a rear lateral link extending generally transversely and disposed rearwardly of the front lateral link and having an articulation point on said axle housing at a height lower than the wheel center, and an upper arm having an articulation point on the axle housing at a height higher than the wheel center. A shock absorber and a coil spring are disposed on or supported by the rear lateral link. In other words, the shock absorber is not disposed on the axle housing. In the known wheel suspension, variation of suspension geometry is suppressed by absorbing a wind up moment imparted to the axle housing due to the shock absorber and the coil spring. As is well known, the shock absorber generates a force depending on its piston speed, while the coil spring generates a force depending on its deformation. Thus, direction of a wind up moment due to the force generated by the coil spring changes at completion of bounding of the wheel and at completion of rebounding of the wheel, while direction of a wind up moment due to the force generated by the shock absorber changes at a moment during bounding and at a moment during rebounding. As a result, the total resulting from superimposing the wind up moment due to the shock absorber on the wind up moment due to the coil spring reveals different values during bounding and rebounding at the same magnitude of speed of vertical motion of the wheel. This hysteresis makes it difficult to utilize the wind up moment in restraining variation of suspension geometry which tends to occur during cornering of the vehicle.

An object of the present invention is to improve a wheel suspension of the above kind such that the variation of suspension geometry during cornering is restrained by utilizing a wind up moment imparted to an axle housing.

SUMMARY OF THE INVENTION

According to the present invention, there is provided a wheel suspension for rear wheels of an automotive vehicle having a vehicle body, comprising:

an axle housing rotatably carrying each of the rear wheels and having a wheel center;

a radius rod extending forwardly and inwardly, as viewed in a normal forward driving direction of the vehicle, and having a first articulation on said axle housing at a position lower than said wheel center;

a front lateral link extending generally transversely with respect to the vehicle body, as viewed in the normal forward driving direction of the vehicle, and having a second articulation point on said axle housing at position lower than said wheel center;

a rear lateral link extending generally transversely and disposed rearwardly of said front lateral link, as viewed in the normal forward driving direction, and having a third articulation point on said axle housing at position lower than said wheel center;

an upper arm articulated to said axle housing at a portion higher than said wheel center;

a spring disposed on said rear lateral link for bearing weight of the vehicle body;

a shock absorber, with a shock absorber logitudinal axis, having at a lower end portion thereof a fourth point on said axle housing, said shock absorber having an upper end portion for connection to the vehicle body;

said shock absorber being so arranged as to provide an arrangement wherein, viewing said axle housing in a transverse direction with respect to the normal forward driving direction of the automotive vehicle, said shock absorber longitudinal axis passes through a predetermined limited area about said wheel center; and means so constructed and arranged as to provide an arrangement wherein loading said axle housing at said portion where said upper arm is articulated to said axle housing in a rearward direction with respect to the normal forward direction causes said upper arm to position said portion inwardly with respect to the vehicle body, and loading said axle housing at said portion where said upper arm is articulated to said axle housing in the normal forward direction causes said upper arm to position said portion outwardly with respect to the vehicle body.

According to one embodiment, there are on the vehicle body side a front pivot and a rear pivot pivotally connecting said upper arm with respect to the vehicle body. The front pivot is located forwardly outwardly of the rear pivot with respect to the normal forward driving direction of the vehicle and the vehicle body.

According to another embodiment, there are on the vehicle body side a front pivot and a rear pivot pivotally connecting the upper arm with respect to the vehicle body. The front pivot is located forwardly of the rear pivot with respect to the normal forward driving direction of the vehicle. The front and rear pivots have different resilient characteristics providing different spring constants in transverse direction with respect to the normal forward driving direction of the vehicle. The spring constant in the transverse direction of the front pivot being greater than that of the rear pivot.

Further, the front and rear pivots have different resilient characteristics providing different spring constants in transverse direction with respect to the normal forward driving direction of the vehicle. The spring constant in the transverse direction of the front pivot is greater than that of the rear pivot.

According to further embodiment, with a resilient bushing, the upper arm is articulated to the axle housing. The resilient bushing has an axis extending obliquely from a forward outward point to a rearward inward point as viewed the vehicle in a plan view.

BRIEF DESCRIPTION OF THE DRAWINGS

FIG. 17(a) show direction of wind up moment in four phases according to the conventional installation of shock absorber;

FIG. 17(b) show direction of wind up moment in the same four phases due to force generated by a coil spring;

FIGS. 18(a), 18(b) and 18(c) are schematic diagrams for explaining a second embodiment of a wheel suspension according to the present invention;

FIGS. 19(a), 19(b) and 19(c) are schematic diagrams for explaining a third embodiment of a wheel suspension according to the present invention;

FIGS. 20(a), 20(b) and 20(c) are schematic diagrams for explaining a third embodiment of a wheel suspension according to the present invention; and FIGS. 21(a), 21(b) and 21(c) are schematic diagrams for explaining a third embodiment of a wheel suspension according to the present invention.

DETAILED DESCRIPTION OF THE INVENTION

Figure 1:
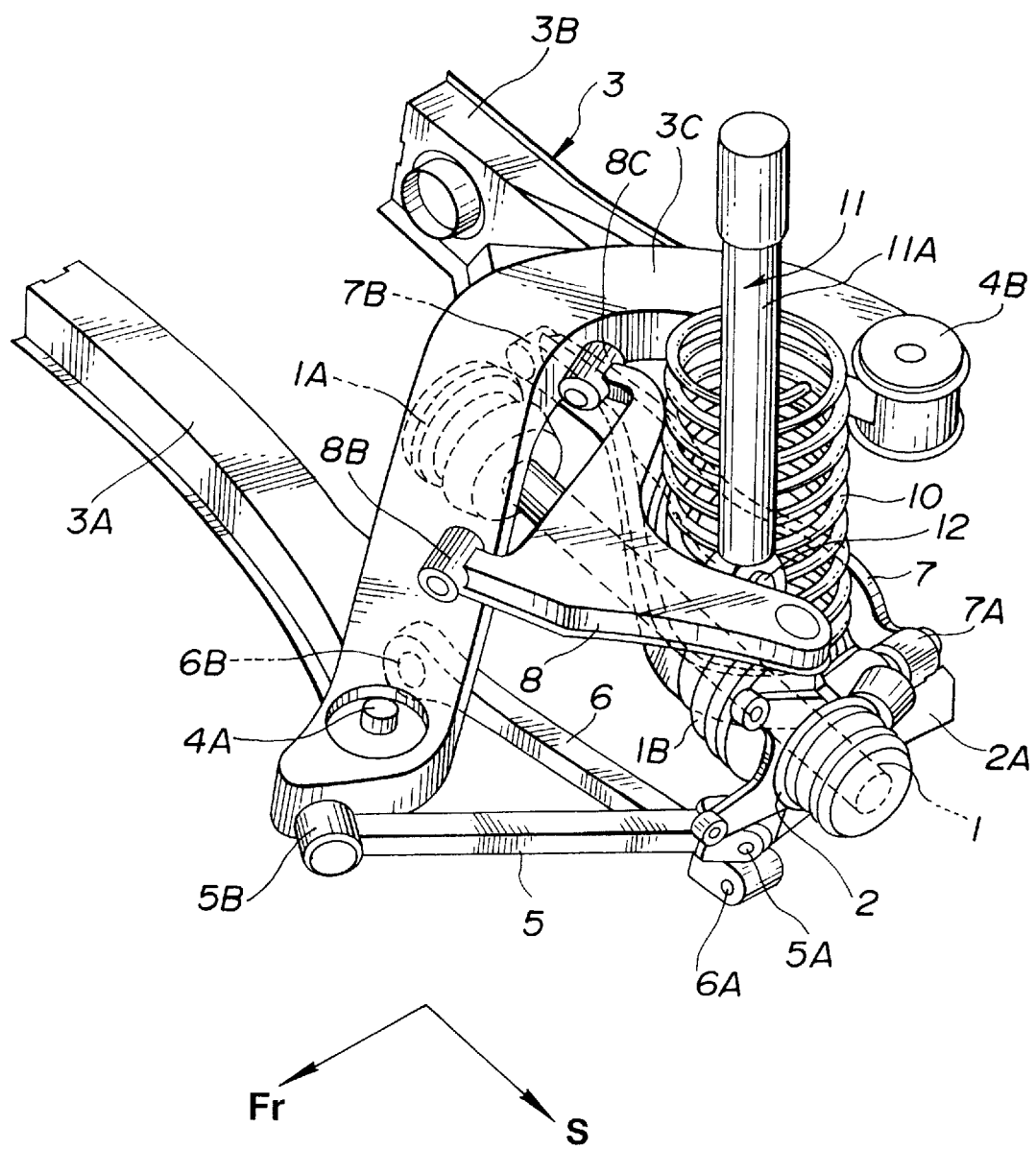
FIG. 1 is a perspective view of a first preferred embodiment of a wheel suspension for a rear left wheel of an automotive vehicle according to the present invention.

Referring to the drawings, various preferred embodiments according to the present invention are explained. Throughout the drawings, an arrow Fr is used to indicate a normal forward driving direction of an automotive vehicle, an arrow S is used to indicate a transverse outward direction with respect to the normal forward direction or the vehicle body, and an arrow U is used to indicate an upward direction with respect to the vehicle body.

Referring to FIGS. 1 through 4, a first preferred embodiment according to the present invention is explained.

FIG. 1 is a perspective view of the structure of the first embodiment of a wheel suspension for a left side rear wheel of the automotive vehicle. Although the wheel suspension for the left side rear wheel is used for the following description, it will be noted that a wheel suspension for a right side rear wheel is identically formed.

The wheel suspension comprises an axle housing or wheel carrier 2 rotatably supporting an axle 1 extending transversely with respect to the vehicle. The axle 1 extends through the axle housing 2 and has an end portion projected outwardly of the axle housing 2. Fixedly coupled with this end portion are a wheel and a disc rotor, not shown. In this manner, the axle housing 2 rotatably supports the wheel. Via constant velocity universal joints 1A and 1B, the axle is driven by a final differential, not shown.

Arranged below the vehicle body is a suspension member generally designated by the reference numeral 3. The suspension member 3 includes transversely or laterally extending members 3A and 3B which are spaced in the normal forward driving direction to interpose therebetween the final differential. These transversely extending members 3A and 3B are connected at right side ends thereof to a side member on the right side, not shown, and at left side ends thereof to a side member 3C on the left side. The side members are connected to the vehicle body via resilient insulators at four points. Specifically, the side member 3C is connected at a front end portion to the vehicle body via a resilient insulator 4A and at a rear end portion to the vehicle body via a resilient insulator 4B. These resilient insulators may be of a double layer cylindrical rubber type, for example.

The axle housing 2 is supported by a plurality of links, rod and arm.

Figure 2:
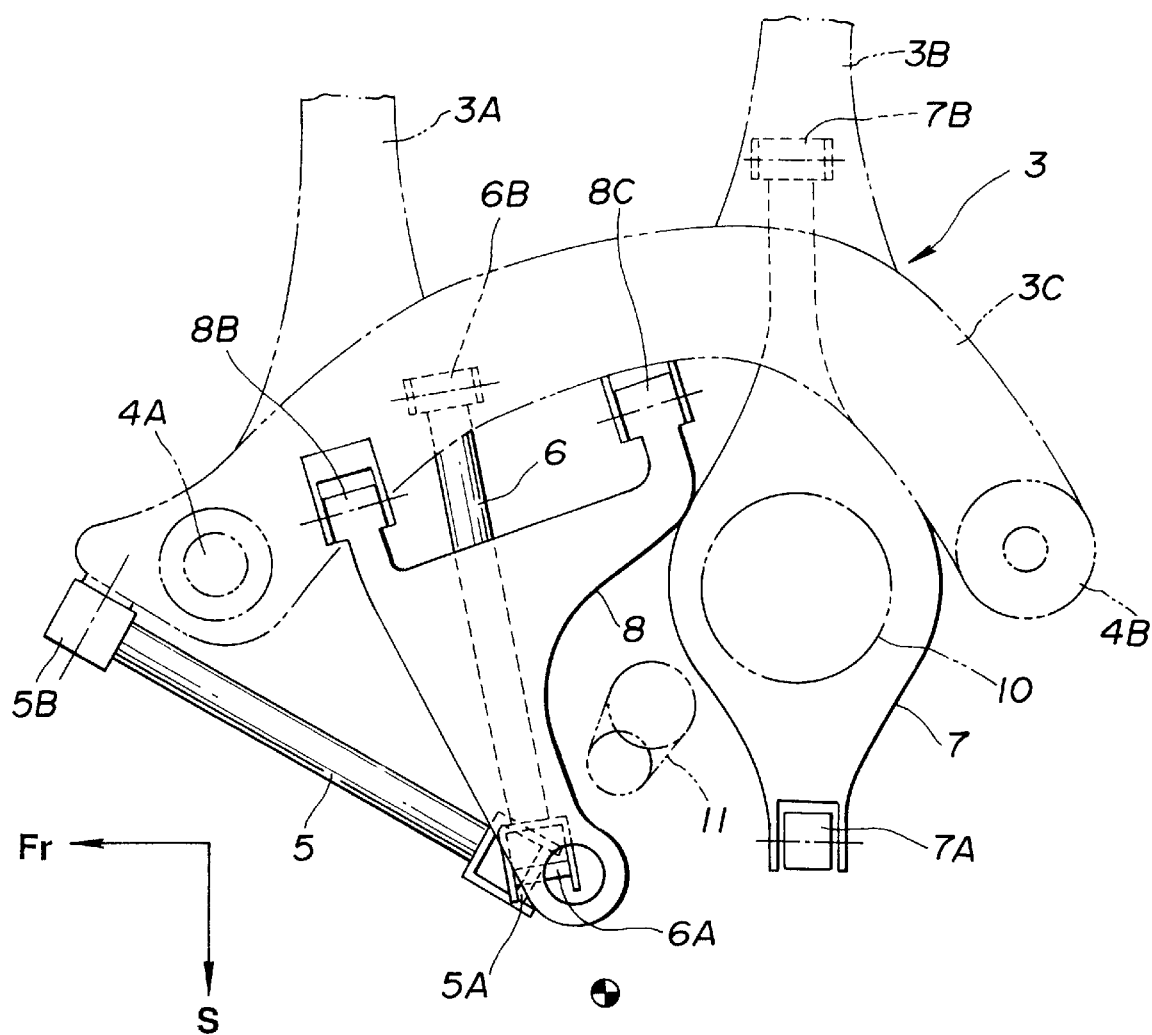
FIG. 2 is a schematic top plan view of the wheel suspension with unnecessary parts or portions removed to illustrate arrangement of a radius rod, an upper arm, a front lateral link and a rear lateral link in association with a suspension member.
Figure 5:
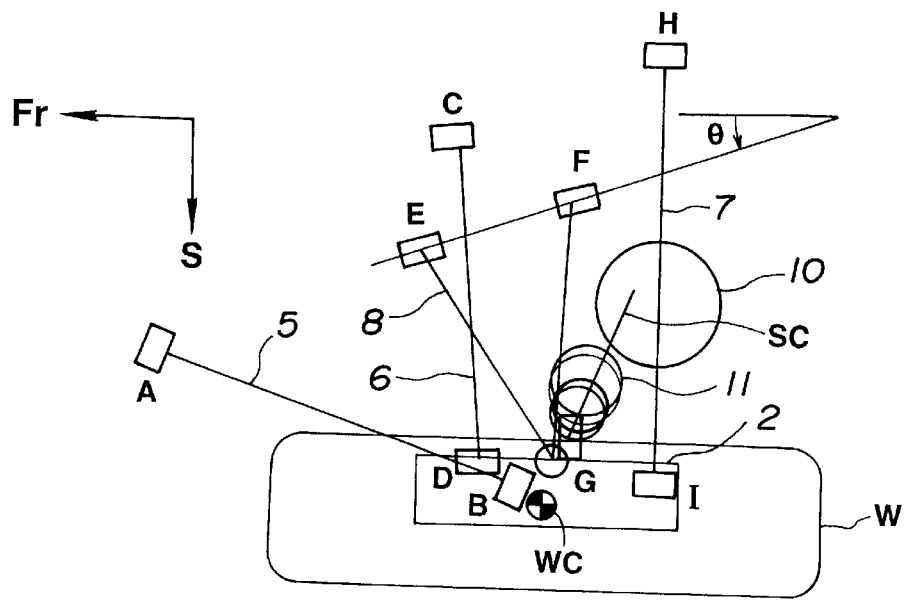
FIG. 5 is a schematic diagram of a top plan view of the wheel suspension.

In the top plan view shown in FIG. 2, the configuration and arrangement of links, rod and arm which are disposed between to interconnect the axle housing 2 and the suspension member 3 are illustrated. As is readily understood from FIGS. 1, 2, 5, 6 and 7, a radius rod 5 has an articulation point B on the axle housing 2 at a position lower than and forward of a wheel center WC and extends forwardly and inwardly, as viewed in the normal forward driving direction Fr or with respect to the vehicle body. As best seen in FIG. 5, the radius rod 5 has the opposite articulation point A on the side member 3C of the suspension member 3 (see FIG. 1). Specifically, via a resilient bushing 5A, the radius rod 5 is pivotally connected at the articulation point B to the axle housing 2 and, via a resilient bushing 5B, the radius rod 5 is pivotally connected at the opposite articulation point A to the side member 3C of the suspension member 3.

A front lateral link 6 has an articulation point D on the axle housing 2 at a position lower than and forward of the wheel center WC and lower than the articulation point B and extends generally transversely with respect to the normal forward driving direction Fr or the vehicle body. The front lateral link 6 has the opposite or inboard articulation point C on the transversely extending member 3A of the suspension member 3 (see FIG. 1). Via a resilient bushing 6A, the front lateral link 6 is pivotally connected at the articulation point D to the axle housing 2, and via a resilient bushing 6B, the front lateral link 6 is pivotally connected at the opposite articulation point C to the transversely extending member 3A.

As viewed in the normal forward driving direction Fr, a rear lateral link 7 is disposed rearwardly of the front lateral link 6. The rear lateral link 7 has an articulation point I on an integral arm 2A of the axle housing 2 at a position lower than and rearward of the wheel center WC and extends generally transversely. The rear lateral link 7 has the opposite or inboard articulation point H on the transversely extending member 3B of the suspension member 3. Via a resilient bushing 7A, the rear lateral link 7 is connected at the articulation point I to the axle housing 2, and via a resilient bushing 7B, the rear lateral link 7 is connected at the articulation point H to the transversely extending member 3B of the suspension member 3.

Pivot axes of the resilient bushings 5A and 5B for the radius rod 5 are parallel and, as viewed in the normal forward driving direction in the plan view of FIG. 2 or 5, each of the pivot axes extends from a point disposed outwardly toward a point disposed rearwardly and inwardly. Pivot axes of the resilient bushings 6A and 6B for the front lateral ink 6 are parallel and extend generally in the normal forward driving direction Fr. Each of these bushings 5A, 5B, 6A, 6B, 7A and 7B is of the dual-cylinder type.

Figure 3:
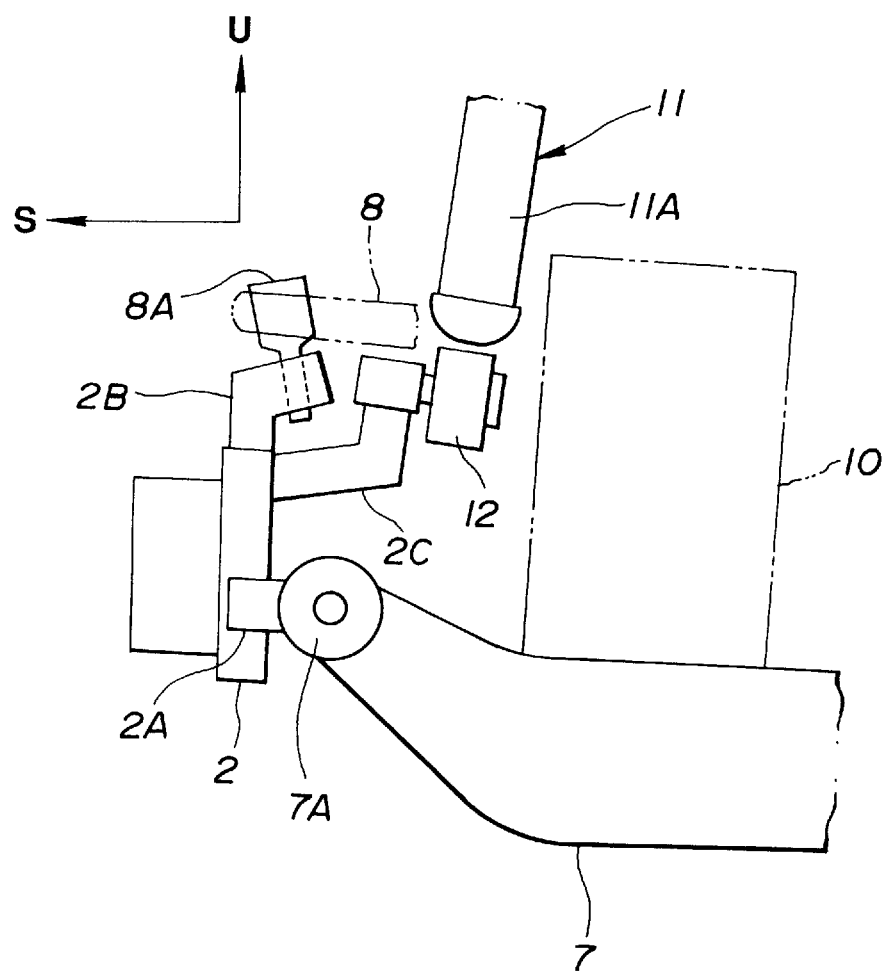
FIG. 3 is a diagrammatic rear end view of the wheel suspension with unnecessary parts or portions removed to illustrate points or portions at which the rear lateral link, a shock absorber and an upper arm are connected to an axle housing.
Figure 6:
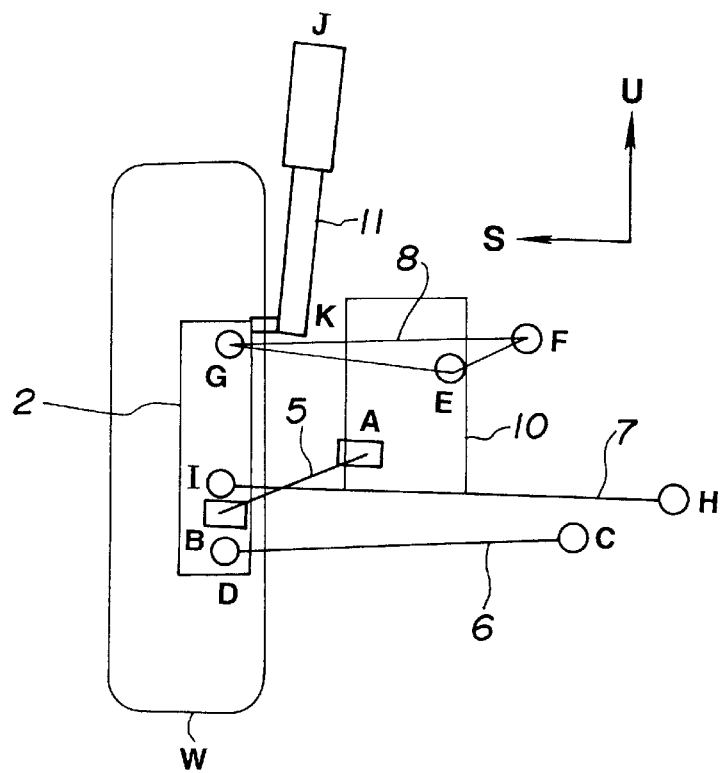
FIG. 6 is a schematic diagram of a rear view of the wheel suspension.
Figure 7:
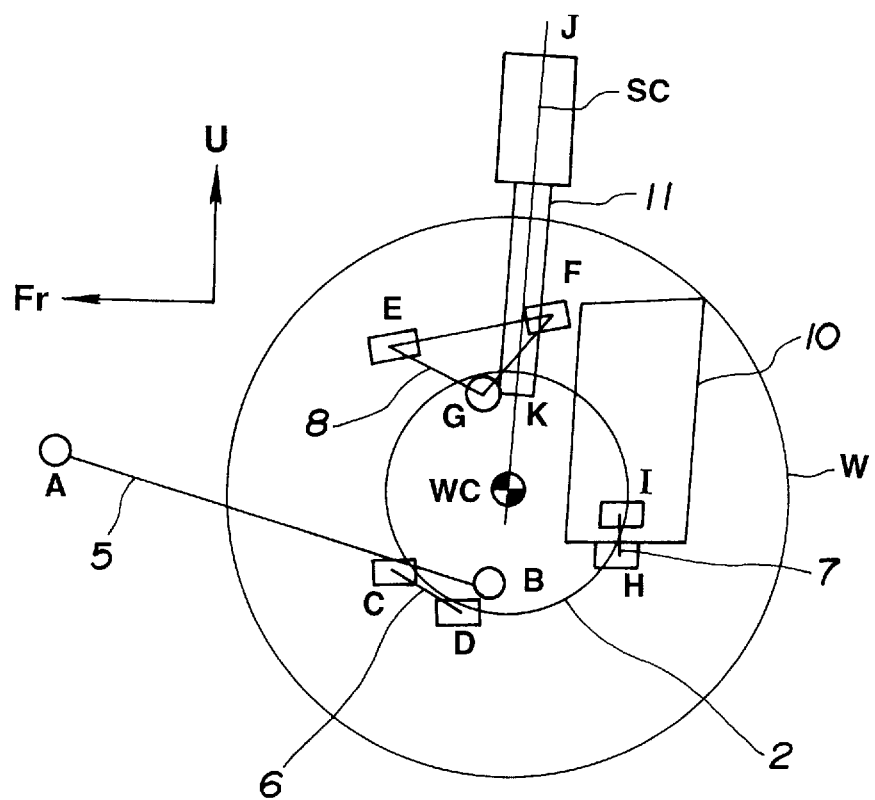
FIG. 7 is a schematic diagram of a side view of the wheel suspension.

As best seen in FIG. 3, the axle housing 2 has an integral upwardly projected arm 2B on which an upper arm 8 has an articulation point G (see FIGS. 5, 6 and 7). The articulation point G is located at a position higher than the wheel center WC. Via a ball joint 8A, the upper arm 8 is articulated at the point G to the integral arm 2B of the axle housing 2. The upper arm 8 has a generally Y-shaped configuration including a curved rear edge for permitting operational space for a shock absorber 11 in the form of a hydraulic damper including a piston slidably disposed in a cylinder. The upper arm 8 has spaced front and rear inboard articulation points E and F on the side member 3C of the suspension member 3. Via pivots 8B and 8C including resilient bushings, the upper arm 8 is pivotally connected at the front and rear inboard articulation points E and F to the side member 3C of the suspension member 3. For minimizing undesired deformation of the resilient bushings, axes of the front and rear inboard pivots 8B and 8C are coaxially aligned. The front pivot 8B is located forwardly outwardly of the rear pivot 8C with respect to the normal forward direction Fr of the vehicle and the vehicle body.

For facilitating transverse movement of the upper arm 8 to position a portion at which the upper arm 8 is connected to the axle housing upon loading this portion forwardly or rearwardly with respect to the normal forward driving direction of the vehicle, the axes of the front and rear pivots 8B and 8C are disposed on an imaginary line extending from a forwardly and outwardly point to a rearwardly inward point as viewed in the normal forward driving direction Fr and with respect to the vehicle body.

As best seen in FIG. 2, the rear lateral link 7 has a substantially elliptical widened area upon which a coil spring 10 is supported or mounted. The coil spring 10 extends generally upwardly toward the vehicle body. In the conventional manner, the coil spring 10 is fixedly connected at an upper end thereof to the vehicle body to bear weight of the vehicle body. The weight of the vehicle body is supported via the coil spring 10 by the rear lateral link 7. The weight borne by the rear lateral link 7 is supproted via the resilient bushing 7A, arm 2A, axle housing 2 and wheel by the road surface.

As seen in FIG. 3, the axle housing 2 has an integral arm 2C extending upwardly inwardly from an upper inward side thereof. The shock absorber 11 has at a lower end portion thereof an articulation point K on the arm 2C of the axle housing 2. At an upper end portion, the shock absorber 11 has a connection point J on the vehicle body (see FIG. 5). Via a resilient bushing 12, the shock absorber 11 is connected at the articulation point K to the arm 2C of the axle housing 2. The shock absorber 11 extends upwardly inwardly and slightly rearwardly.

Figure 4:
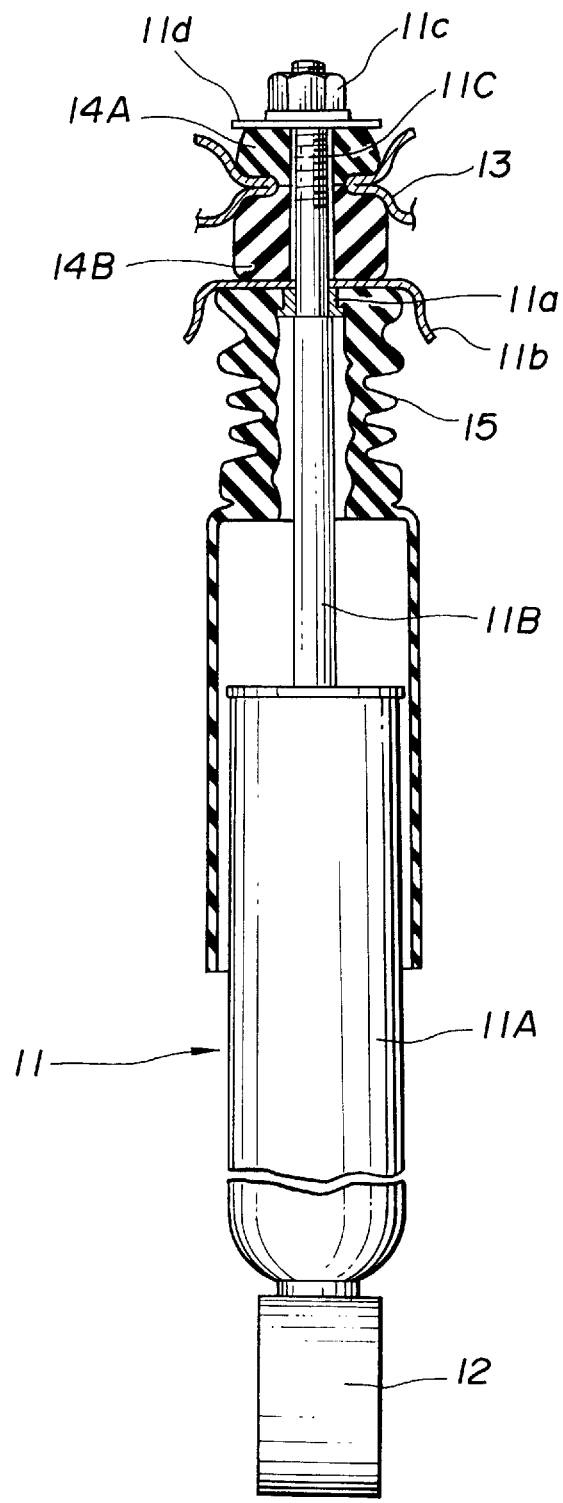
FIG. 4 is a plan view of the shock absorber partially broken away to show a bumper rubber.

As shown in FIG. 4, the shock absorber 11 includes a piston rod 11B extending upwardly from an upper end of a cylinder 11A. The piston rod 11B has at an upper portion thereof a screw 11C formed with a thread. A bracket 11b is fitted on the screw 11C via a sleeve 11a. Between the bracket 11b and a washer 11d of a nut 11c engaged with the screw 11C are resilient members 14A and 14B interposing therebetween a portion 13 of the vehicle body. This portion 13 is formed with an aperture through which the screw 11C passes. In mounting, the nut 11c is tightened after inserting the screw 11C through the portion 13 of the vehicle body and mounting the resilient member 14A and the washer lid.

A bellows-like bump rubber 15 is provided between the upper end of the cylinder 11A and the bracket 11b. This bump rubber 15 is coaxially mounted to the shock absorber 11. Specifically, the bump rubber 15 has a bellows-like section surrounding the piston rod 11B in axially spaced relation to the upper end of the cylinder 11A and a sleeve section extending donwardly and surrounding the upper end portion of the cylinder 11A. Normally, the bellows-like section of the bump rubber 15 is out of contact with the upper end of the cylinder 11A, but the bellows-like section is compressed between the cylinder 11A and the bracket 11b to prevent direct contact of the cylinder 11A with the bracket 11b during excessive bounding of the wheel carried by the axle housing 2.

As best seen in FIG. 7, the shock absorber 11 has a longitudinal axis designated by the reference character SC and so arranged as to provide an arrangement where, viewing the axle housing 2 in the transverse direction with respect to the normal forward driving direction Fr or in the side view shown in FIG. 7, the logitudinal axis SC passes through a predetermined limited area about the wheel center WC. Preferrably, the longitudinal axis SC crosses the wheel center WC as shown in FIG. 7.

FIGS. 5, 6 and 7 are schematic diagrams of top plan, rear end and side views for illustrating the positional relation between the components of the wheel suspension. In these Figures, A represents the connection point between the radius rod 5 and the suspension member 3. B represents the connection point between the radius rod 5 and the axle housing 2. C represents the connection point between the front lateral link 6 and the supension member 3. D represents the connection point between the front lateral link 6 and the axle housing 2. E represents the forward connection point between the upper arm 8 and the suspension member 3. F represents the rearward connection point between the upper arm 8 and the suspension member 3. G represents the connection point between the upper arm 8 and the axle housing 2. H represents the connection point between the rear lateral link 7 and the suspension member 3. I represents the connection point between the rear lateral link 7 and the axle housing 2. J represents the connection point between the shock absorber 11 and the vehicle body. K represents the connection point between the shock absorber 11 and the axle housing 2. W represents the wheel. WC represents the wheel center.

As is readily seen from FIGS. 5, 6 and 7, the upper arm 8, the imaginary line interconnecting the points E and F is angled with respect to a longitudinal line of the vehicle body by an angle θ as viewed in the top plan view shown in FIG. 5, and the longitudinal line SC of the shock absorber crosses the wheel center WC or passes through a predetermined limited area about the wheel center WC as viewed in side view shown in FIG. 7.

Figure 8A:
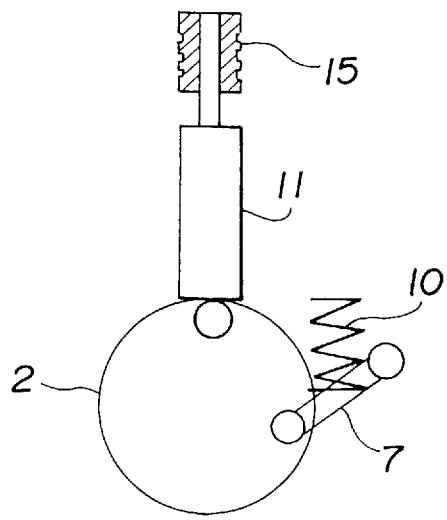
FIG. 8(a) is a diagram illustrating the installation of the shock absorber employed in the wheel suspension according to the present invention.
Figure 8B:
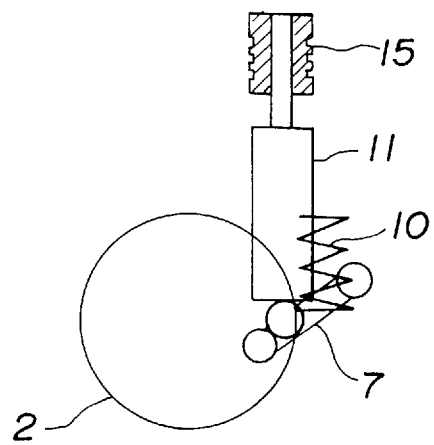
FIG. 8(b) is a diagram illustrating the conventional installation of a shock absorber employed by the known wheel suspensions explained before.

Referring to FIG. 8(a) in comparison with FIG. 8(b), FIG. 8(a) illustrates that a force generated by the shock absorber 11 and a force generated upon compression of the bump rubber make no or little contribution to creation of wind up moment on the axle housing 2 since the shock absorber 11 is connected to the axle housing with its longitudinal axis crossing the wheel center WC as viewed in the side view shown in FIG. 7, while FIG. 8(b) illustrates the before discussed arrangement wherein the forces due to the shock absorber 11 and the bump rubber 15 create substantial wind up moment on the axle housing 2 since the shock absorber 11 and the coil spring 7 are mounted on the rear lateral link 7.

Figure 11:
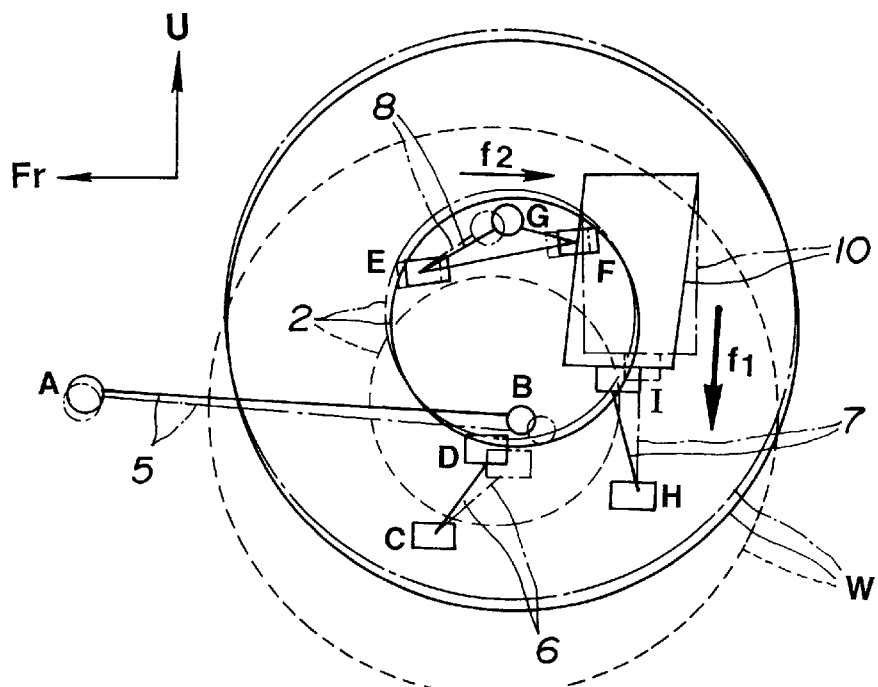
FIG. 11 is a similar view to FIG. 7 illustrating the position of parts during rebounding of the wheel.

During bounding of the wheel, the coil spring 10 is compressed to impart on the axle housing 2 a downward reaction force $f_1$ as shown in FIG. 11, creating a clockwise moment on the axle housing 2 about the wheel center as viewed in FIG. 11. In this case, the connection point G between the upper arm 8 and the axle housing 2 is loaded with a force $f_2$ in the rearward direction with respect to the normal forward driving direction Fr. Owing to this loading, the connection point G moves rearwardly and thus the upper arm 8 tends to move accordingly.

Figure 9:
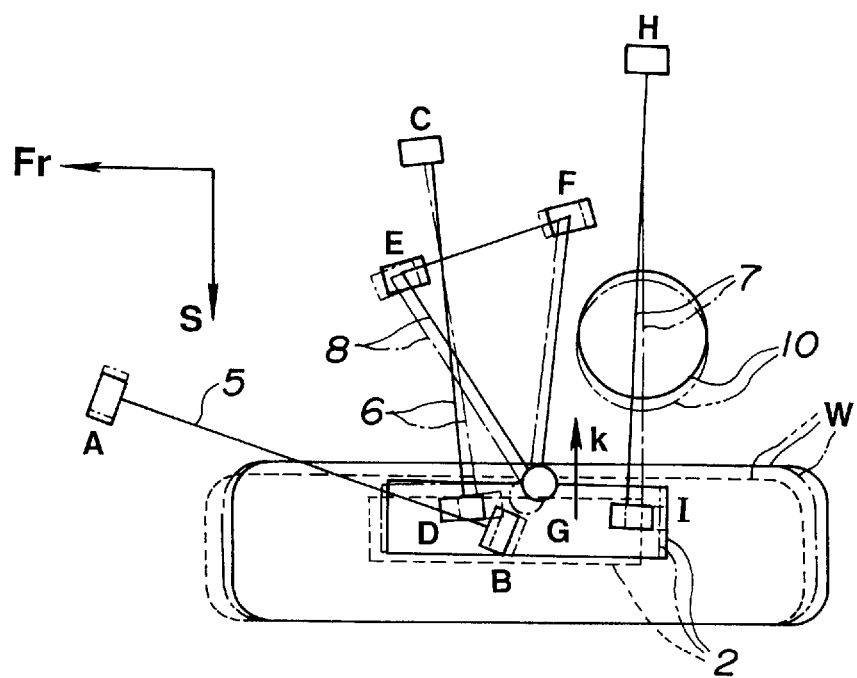
FIG. 9 is a similar view to FIG. 5 illustrating the position of parts during bounding of the wheel.
Figure 10:
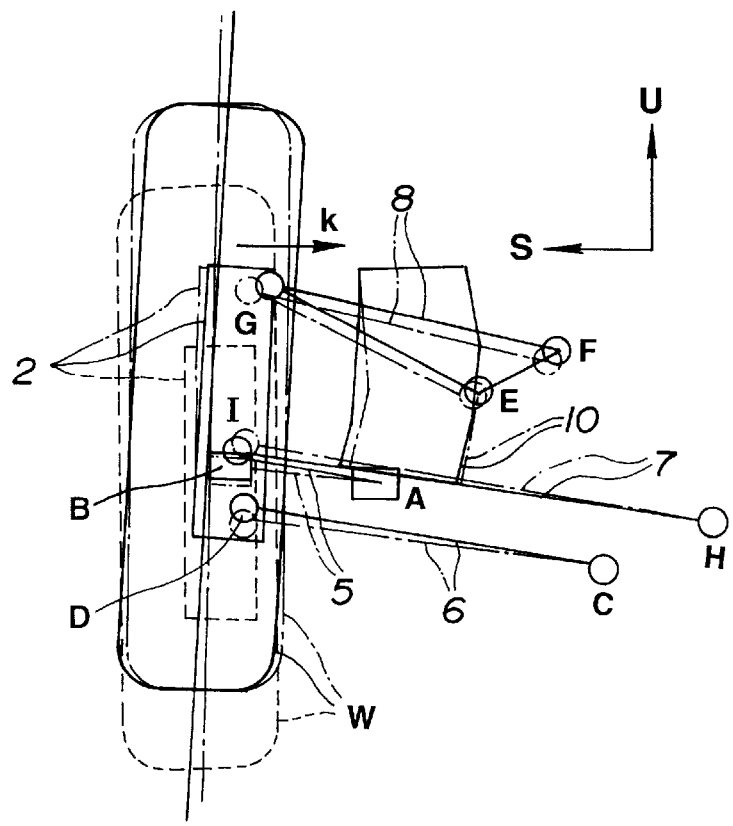
FIG. 10 is a similar view to FIG. 6 illustrating the position of parts during rebounding of the wheel.

In FIGS. 9, 10 and 11, the fully drawn line illustrates the position of components during bounding of the wheel W, the broken line illustrates the position of components during normal state, and the one-dot chain line illustrates the position of components during bounding without any wind up moment.

As explained before, the pivot axles at the forward and rearward inboard connection points E and F are coaxially aligned and angled with respect to the longitudinal line of the vehicle body by the angle θ and the rearward inboard connection point E is disposed rearwardly and inwardly of the forward inboard connection point E. Besides, the resilient bushings 8B and 8C reveal characteristic that the spring constant along the pivot axis is less than the spring constant in a radial direction from the pivot axis. This arrangement allows inward movement of the upper arm 8 in a direction by an arrow k upon loading the connection point G in the rearward direction. Thus, the connection point G moves inwardly although the other connection points D, D and I move inwardly less than the connection point G does.

In other words, since the connection point G positions inwardly than the connection points D, D and I do, the camber of the wheel alters toward a negative side. Since the outer wheel during cornering of the vehicle is subject to bounding, the wheel which would otherwise create a positive camber is positioned toward a negative camber. Thus, the variation of camber of the outer wheel during cornering is suppressed.

Figure 12:
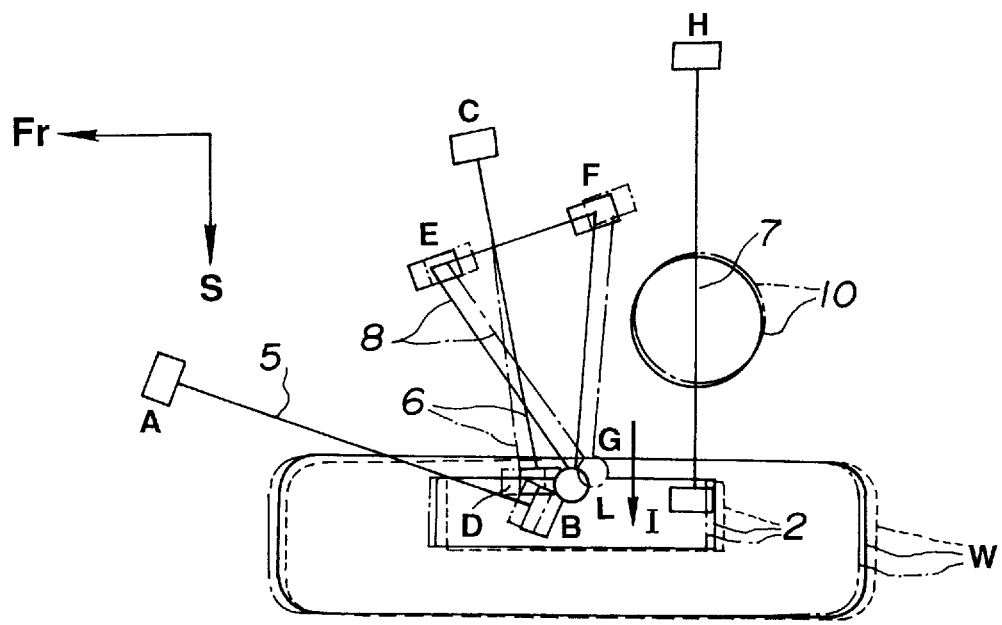
FIG. 12 is a similar view to FIG. 9 illustrating the position of parts during rebounding of the wheel.
Figure 13:
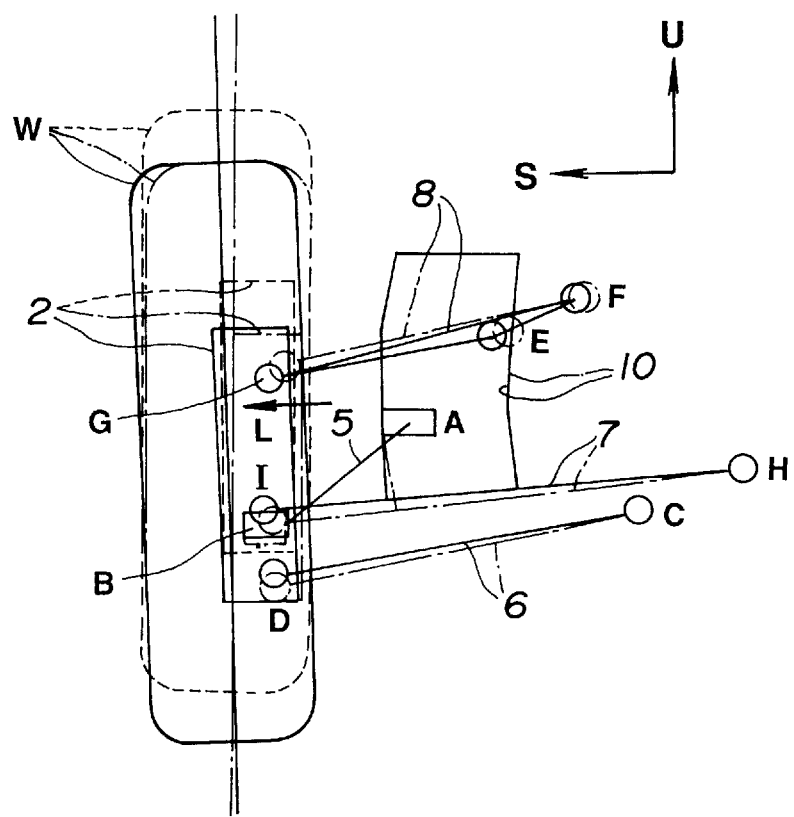
FIG. 13 is a similar view to FIG. 10 illustrating the position of parts during rebounding of the wheel.
Figure 14:
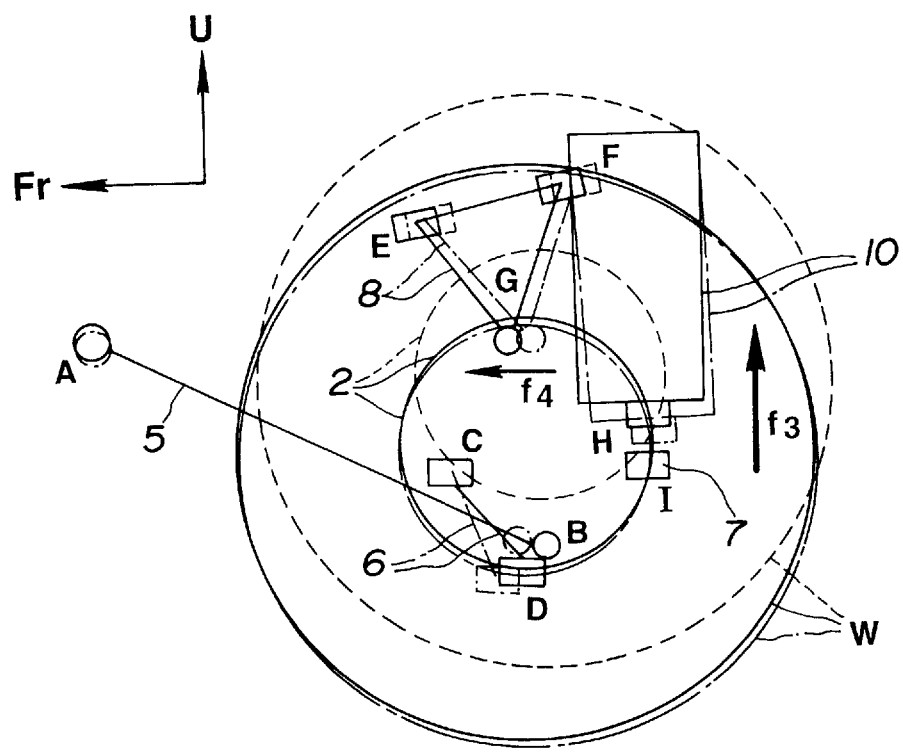
FIG. 14 is a similar view to FIG. 11 illustrating the position of parts during rebounding of the wheel.

Referring to FIGS. 12, 13 and 14, the fully drawn line illustrates the position of components during rebounding of the wheel W, the broken line illustrates the position of components during normal state, and the one-dot chain line illustrates the position of components during rebounding without any wind up moment.

During rebounding of the wheel W, the coil spring 10 extends to impart an upward force $f_3$ on the connection point I between the rear lateral link and the axle housing 2, creating a counterclockwise moment on the axle housing 2 as viewed in FIG. 14. In this case, the connection point G between the upper arm 8 and the axle housing 2 is loaded with a force $f_4$ in the forward direction with respect to the normal forward driving direction Fr. Owing to this loading, the connection point G moves forwardly and thus the upper arm 8 tends to move accordingly.

This causes the upper arm 8 to move outwardly in a direction by an arrow L (see FIG. 12) upon loading the connection point G in the forward direction. Thus, the connection point G moves outwardly although the other connection points D, D and I move outwardly less than the connection point G does.

In other words, since the connection point G positions outwardly than the connection points D, D and I do, the camber of the wheel alters toward a positive side. Since the inner wheel during cornering of the vehicle is subject to rebounding, the wheel which would otherwise create a negative camber is positioned toward a positive camber. Thus, the variation of camber of the inner wheel during cornering is suppressed.

From the preceding description, it is now appreciated that, during cornering of the vehicle, the variation of camber at each of the inner and outer wheels is suppressed, thus improved stability during cornering.

Figure 15:
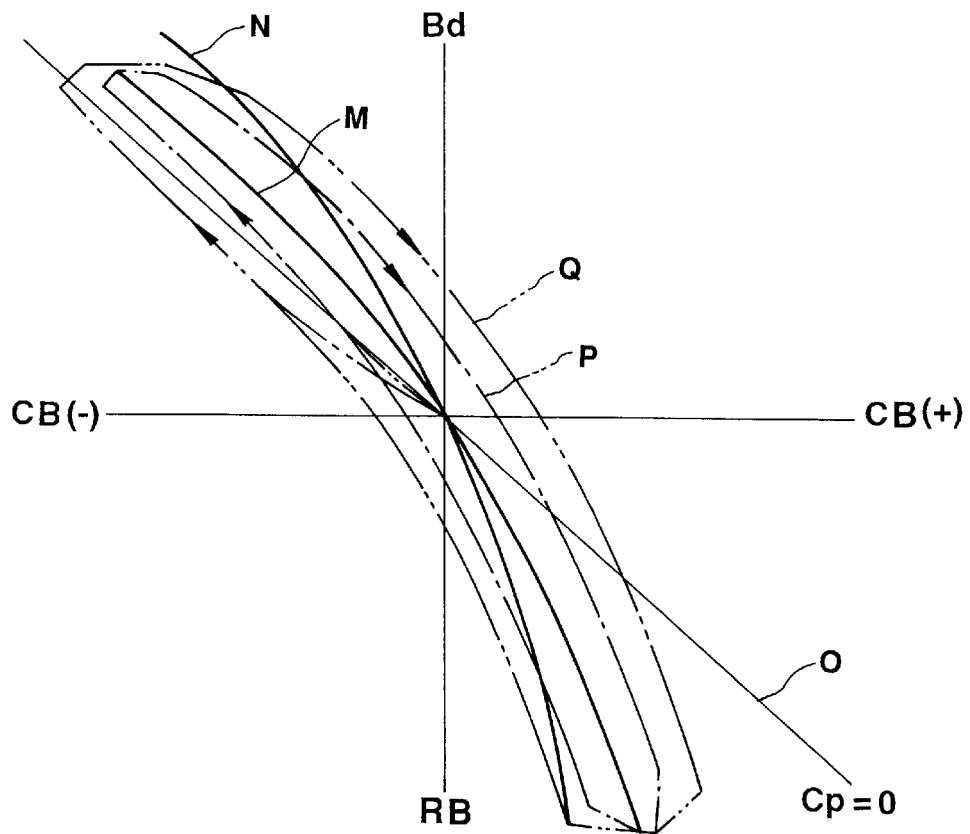
FIG. 15 is a graphical representation of a relation between suspension stroke and camber angle.

FIG. 15 shows a relation between suspension stroke (i.e., Bd=bounding and RB=rebouding on the vertical axis of the graph) and camber variation (CB on the horizontal axis). The operational characteristics of the wheel suspension according to the invention are represented by the fully drawn line M in relation to that, as represented by the fully drawn line N. of a wheel suspension of the type wherein the upper arm does not move positively. A diagonal line O represents an ideal characteristic at which camber is always equal to zero.

As may be seen, the line M representing the invention conforms much more closely to the values of the line 0 representing zero camber, than does the line N representing the conventional arrangement. Thus it may be appreciated that significantly improved camber control is available according to the invention. Lines P and Q of FIG. 15 will be explained in detail hereinlater in reference to response speed of the suspension arrangement, etc.

It will be noted that the structure according to the invention in which the upper arm 8 is connected to the longitudinal portion 3C of the suspension member at forward and rearwardly oriented resilient connection points E and F (i.e. 8B, 8C) significantly reduces the complexity of the overall suspension structure and thus considerable cost savings may be realized in production even though enhanced performance characteristics are obtained.

Figure 16:
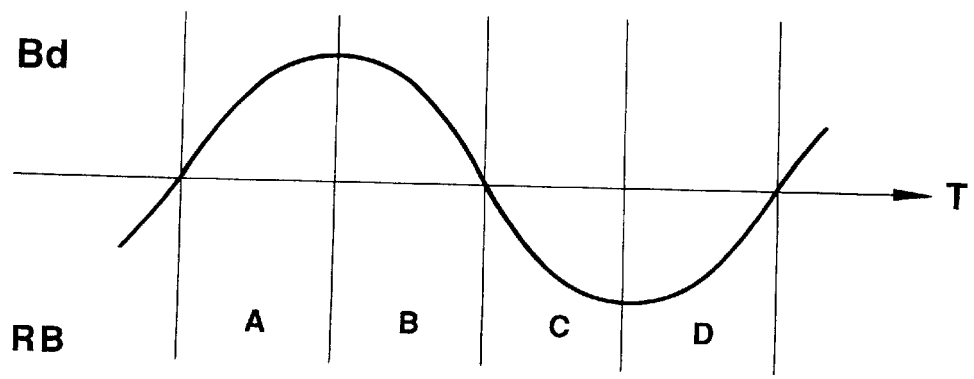
FIG. 16 is a graphical representation of suspension stroke with respect to time.

Hereinbelow the description will refer to the graph of FIG. 16, which illustrates characteristics of suspension stroke variation established according to the suspension structure of the preferred embodiment. In FIG. 16, a wavy line SS represents a maximum degree rebound RB at the nadir and a maximum degree of bounding Bd at the peak. In other words a maximum of difference in suspension stroke variation is shown by the line SS. Proceeding from left to right in FIG. 16, the first section A (T=A) indicates a timing during which the vehicle suspension is moving from a rebounding condition to a maximum bounding Bd stroke. T=B is a time during which the suspension moves from a maximum bound to a middle or neutral position (N) at the horizontal line T, while time period T=C is a time from which the suspension motion is proceeding from the bounding position of B from the neutral position to a maximum rebound position. And time period T=D is a recovery period during which the suspension moves from a maximum rebound position to pass the neutral position to enter a bound condition once more.

FIGS. 17 (1) to (4) show timing charts (a) and (b) over time periods A–D corresponding to the timings shown in FIG. 16. FIGS. 17(a) 1–4 respectively show the direction of windup forces applied to the axle housing 2 by a shock absorber 11 in the preferred suspension structure of FIG. 8(a). FIGS. 17(b) 1–4 respectively show the direction of windup forces applied to an axle housing 2 by a coil spring 10 mounted on a rear lateral link 7 in a suspension structure such as shown in either of FIGS. 8(a) or 8(b).

As may be appreciated from FIG. 17(a), a compression stroke of the shock absorber 11 applies a wind up moment to the axle housing 2 in a clockwise direction at timings A and D while during an expansion stroke a counter clockwise wind up force is applied to the axle housing 2 during timings B and C.

On the other hand, referring to FIG. 17(b), the a wind up moment of the spring force of the coil spring 10 during suspension operation applies clockwise wind up force to the axle housing 2 at timings A and B while counterclockwise wind up force is generated during at time periods C and D.

Since the wind up moment of the shock absorber 11 is dependent on an speed of operation thereof while the wind up moment of the coil spring is dependent on a suspension stroke, the timings and directions of the wind up forces applied to the axle housing are not the same over time during suspension operation (i.e. vehicle travel).

In a conventional suspension arrangement such as that of FIG. 8(b), where shock absorber 11 and coil spring 10 wind up moments are both applied to the rear lateral link 7, it may be seen in FIG. 15 that the response time of the shock absorber shown by the dashed line P and that of the coil spring 10 shown by the double dashed line Q are different. Accordingly the speed of suspension stroke response is subject to hysteresis generated by these differing responses applied commonly to the rear lateral link 7. Accordingly, the ability to control camber variation in a conventional suspension structure such as that of FIG. 8(b) is limited and may not be improved beyond the limitations of suspension stroke response inherent in such conventional arrangements.

In a suspension arrangement according to the invention such as shown in FIG. 8(a) wherein only the wind up moment of the coil spring 10 is applied to the rear lateral link 7 the generation of the wind up moment in dependent only upon the size of the suspension stroke. Thus, the line M of FIG. 15 shows suspension characteristics wherein camber variation control may be effected without the influence of such hysteresis. Thus suspension of the invention may be set to show considerably improved operational characteristics during vehicle travel.

FIGS. 18(a), (b) and (c) show a top view of an upper arm 8 and axle housing 2 according to a second preferred embodiment of the invention for explaining operational aspects thereof in neutral, bounding and rebounding conditions.

According to the present embodiment, the flexible bush 8B and 8C which pivotally mount the upper arm to the suspension member 3 of the vehicle are constructed in such a manner that in addition to pivotal movement of the resilient bush 8B or 8C, a degree of axial sliding movement thereof is further provided. Thus, although other operational considerations and structure is the same as the above described first embodiment, the resilient connections E and F are also interlinked in an axially slidable manner as may be appreciated from FIGS. 18(a), (b) and (c).

FIG. 18(a) shows the suspension arrangement of the second embodiment in a rest, or neutral position N. FIGS. 18(b) and 18(c) show the operation of the upper arm 8 during bounding and rebounding conditions of the suspension respectively.

As in the first embodiment, during a bounding condition (FIG. 18(b)) the force f2 is generated and input to the resilient connection G at the axle housing 2 and translated as movement inwardly at the vehicle side. Conversely, during a rebounding condition (FIG. 18(c)), the force f4 is generated to and input to the resilient connection G at the axle housing 2 and translates to movement outwardly at the vehicle side. In this respect the same effect as the first embodiment is obtained. In addition, according to the axially sliding arrangement of the resilient connections E and F (8B, 8C), a possible positional variation of the axle housing 2 via the resilient connection G becomes larger. Thus a large degree of camber variation is allowable according to the second embodiment. Consequently, the characteristics indicated by the line M of FIG. 15 achieve values even closer to the zero variation line 0.

FIGS. 19(a), (b) and (c) show a top view of an upper arm 8 and axle housing 2 according to a third preferred embodiment of the invention for explaining operational aspects thereof in neutral, bounding and rebounding conditions.

According to the third embodiment, the flexible bush 8B and 8C which pivotally mount the upper arm to the suspension member 3 of the vehicle are constructed to be aligned substantially parallel to a longitudinal axis of the vehicle, simplifying design and installation considerations. And further, the flexible bush 8B and 8C are constructed in such a manner that a degree of spring force established for allowing lateral movement of the resilient connection E (resilient bush 8B) is set to be less than a spring force set for resilient connection F (resilient bush 8C). Thus, greater lateral movement of the resilient connection F is established, in other words, soft Sf response characteristics are set for the resilient bush 8C. Conversely, the lower degree of lateral resiliency set for the resilient bush 8B establishes hard Hd response characteristics thereof.

FIG. 19(a) shows the suspension arrangement of the third embodiment in a rest, or neutral position N. FIGS. 19(b) and 19(c) show the operation of the upper arm 8 during bounding and rebounding conditions of the suspension respectively.

As in the previous embodiments, during a bounding condition (FIG. 19(b)) the force f2 is generated and input to the resilient connection G at the axle housing 2 and translated as movement inwardly at the vehicle side. Conversely, during a rebounding condition (FIG. 19(c)), the force f4 is generated to and input to the resilient connection G at the axle housing 2 and translates to movement outwardly at the vehicle side. In this respect However, according to the hard and soft lateral movement characteristics established respectively for the resilient connections E and F (8B, 8C), due to the greater lateral freedom of movement permitted at the resilient bush 8C, positional variation of the axle housing 2 via the resilient connection G becomes larger. Accordingly, the present embodiment also allows large degree of camber variation. Consequently, the characteristics indicated by the line M of FIG. 15 may be come closer to zero camber variation as indicated by the line 0.

FIGS. 20(a), (b) and (c) show a top view of an upper arm 8 and axle housing 2 according to a fourth preferred embodiment of the invention for explaining operational aspects thereof in neutral, bounding and rebounding conditions.

According to the present embodiment, the flexible bush 8B and 8C which pivotally mount the upper arm to the suspension member 3 of the vehicle may be constructed similarly to the previous embodiment with a positioning substantially parallel to the longitudinal axis of the vehicle is utilized, the resilient connection G between the upper arm 8 and the axle housing 2 is formed as an axially slidable resilient bush 8D which, as view from above, allows axial movement of the resilient connection G from a forward outer position at the vehicle side to a rearward inner position.

As in the previous embodiments, during a bounding condition (FIG. 20(b)) the force f2 is generated and input to the resilient connection G at the axle housing 2 and translated as movement inwardly at the vehicle side. Conversely, during a rebounding condition (FIG. 20(c)), the force f4 is generated to and input to the resilient connection G at the axle housing 2 and translates to movement outwardly at the vehicle side. In this respect the same effect as the other embodiments are obtained. In addition, according to the axially sliding arrangement of the resilient connection G (resilient bush 8D), a possible positional variation of the axle housing 2 via the resilient connection G becomes larger. Thus a larger degree of camber variation is allowable according to the fourth embodiment and improved camber variation control (i.e. close to zero variation) is achieved with simple structure.

FIGS. 21(a), (b) and (c) show a top view of an upper arm 8 and axle housing 2 according to a fifth preferred embodiment of the invention for explaining operational aspects thereof in neutral, bounding and rebounding conditions. FIG. 21(a) shows the suspension arrangement of the fifth embodiment in a rest, or neutral position N. FIGS. 21(b) and 21(c) show the operation of the upper arm 8 during bounding and rebounding conditions of the suspension respectively.

According to the fifth embodiment, the flexible bush 8B and 8C which pivotally mount the upper arm to the suspension member 3 of the vehicle are constructed in such a manner that a degree of spring force established from allowing lateral movement of the resilient connection E (resilient bush 8B) is set to be less than a spring force set for resilient connection F (resilient bush 8C). Thus, greater lateral movement of the resilient connection F is established, in other words, soft Sf response characteristics are set for the resilient bush 8C. Conversely, the lower degree of lateral resiliency set for the resilient bush 8B establishes hard Hd response characteristics thereof. This arrangement is similar to the above described third embodiment. In the present embodiment however, the resilient bush 8B, 8C are arranged such that an axial line from the resilient bush 8B to the resilient bush 8C is at an angle relative to a longitudinal axis of the vehicle.

In addition, according to the present embodiment the resilient connection G between the upper arm 8 and the axle housing 2 is formed as an axially slidable resilient bush 8D which, as view from above, allows axial movement of the resilient connection G from a forward outer position at the vehicle side to a rearward inner position as utilized in the fourth embodiment.

During a bounding condition (FIG. 21(b)) the force f2 is generated and input to the resilient connection G at the axle housing 2 and translated as movement inwardly at the vehicle side. Conversely, during a rebounding condition (FIG. 21(c)), the force f4 is generated to and input to the resilient connection G at the axle housing 2 and translates to movement outwardly at the vehicle side. In this respect the same effect as the other embodiments are obtained.

However, according to the hard Hd and soft Sf lateral resiliency established for the resilient connections E and F (8B, 8C), along with the axially sliding arrangement of the resilient connection G (resilient bush 8D) positional variation of the axle housing 2 via the resilient connection G may be set to have a substantially large range. Thus the degree of camber variation control according to the fifth embodiment is very great (i.e. closer to the zero camber variation line 0 of FIG. 15).

What is claimed is:

1. A wheel suspension for rear wheels of an automotive vehicle having a vehicle body, comprising:

an axle housing rotatably carrying each of the rear wheels and having a wheel center;

a radius rod extending forwardly and inwardly, as viewed in a normal forward driving direction of the vehicle, and having a first articulation point on said axle housing at a position lower than said wheel center;

a front lateral link extending generally transversely with respect to the vehicle body, as viewed in the normal forward driving direction of the vehicle, and having a second articulation point on said axle housing at a position lower than said wheel center;

a rear lateral link extending generally transversely and disposed rearwardly of said front lateral link, as viewed in the normal forward driving direction, and having a third articulation point on said axle housing at a position lower than said wheel center;

an upper arm articulated to said axle housing at a portion higher than said wheel center;

a spring disposed on said rear lateral link for bearing weight of the vehicle body;

a shock absorber, with a shock absorber longitudinal axis, having a fourth articulation point on said axle housing which is located at a lower end portion of said shock absorber, said shock absorber having an upper end portion for connection to the vehicle body;

said shock absorber being so arranged as to provide an arrangement wherein, viewing said axle housing in a transverse direction with respect to the normal forward driving direction of the vehicle, said shock absorber longitudinal axis passes through a predetermined limited area about said wheel center; and means so constructed and arranged as to provide an arrangement wherein loading said axle housing at said portion where said upper arm is articulated to said axle housing in a rearward direction with respect to the normal forward driving direction causes said upper arm to position said portion inwardly with respect to the vehicle body, and loading said axle housing at said portion where said upper arm is articulated to said axle housing in the normal forward driving direction causes said upper arm to position said portion outwardly with respect to the vehicle body.

2. A wheel suspension as set forth in claim 1, wherein said means include on the vehicle body side a front pivot and a rear pivot pivotally connecting said upper arm with respect to the vehicle body, said front pivot being located forwardly outwardly of the rear pivot with respect to the normal forward driving direction of the vehicle and the vehicle body.

3. A wheel suspension as set forth in claim 1, wherein said means include on the vehicle body side a front pivot and a rear pivot pivotally connecting said upper arm with respect to the vehicle body, said front pivot being located forwardly of the rear pivot with respect to the normal forward driving direction of the vehicle, said front and rear pivots having different resilient characteristics providing different spring constants in transverse direction with respect to the normal forward driving direction of the vehicle, said spring constant in the transverse direction of said front pivot being greater than that of said rear pivot.

4. A wheel suspension as set forth in claim 2, wherein said front and rear pivots have different resilient characteristics providing different spring constants in transverse direction with respect to the normal spring constant in the transverse direction of said front pivot being greater than that of said rear pivot.

5. A wheel suspension as set forth in claim 1, wherein said means includes a resilient bushing via which said upper arm is articulated to said axle housing, said resilient bushing having an axis extending obliquely from a forward outward point to a rearward inward point as viewed the vehicle in a plan view.

6. A wheel suspension as set forth in claim 2, wherein said means include a resilient bushing via which said upper arm is articulated to said axle housing, said resilient bushing having an axis extending obliquely from a forward outward point to a rearward inward point as viewed the vehicle in a plan view.

7. A wheel suspension as set forth in claim 3, wherein said means include a resilient bushing via which said upper arm is articulated to said axle housing, said resilient bushing having an axis extending obliquely from a forward outward point to a rearward inward point as viewed the vehicle in a plan view.

8. A wheel suspension as set forth in claim 4, wherein said means include a resilient bushing via which said upper arm is articulated to said axle housing, said resilient bushing having an axis extending obliquely from a forward outward point to a rearward inward point as viewed the vehicle in a plan view.

9. In a wheel suspension for rear wheels of an automotive vehicle having a vehicle body, comprising:

an axle housing rotatably carrying each of the rear wheels and having a wheel center;

a radius rod extending forwardly and inwardly, as viewed in a normal forward driving direction of the vehicle, and having a first articulation point on said axle housing at a position lower than said wheel center;

a front lateral link extending generally transversely with respect to the vehicle body, as viewed in the normal forward driving direction of the vehicle, and having a second articulation point on said axle housing at a position lower than said wheel center;

a rear lateral link extending generally transversely and disposed rearwardly of said front lateral link, as viewed in the normal forward driving direction, and having a third articulation point on said axle housing at a position lower than said wheel center;

an upper arm articulated to said axle housing at a portion higher than said wheel center;

a spring disposed on said rear lateral link for bearing weight of the vehicle body;

a shock absorber, with a shock absorber longitudinal axis, having an upper end portion for connection to the vehicle body;

the improvement wherein said shock absorber has a fourth articulation point on said axle housing and is so arranged as to provide an arrangement wherein, viewing said axle housing in a transverse direction with respect to the normal forward driving direction of the automotive vehicle, said shock absorber longitudinal axis passes through a predetermined limited area about said wheel center; and said upper arm is connected between the vehicle body side and the axle housing side so as to provide an arrangement wherein loading said axle housing at said portion where said upper arm is articulated to said axle housing in a rearward direction with respect to the normal forward driving direction causes said upper arm to position said portion inwardly with respect to the vehicle body, and loading said axle housing at said portion where said upper arm is articulated to said axle housing in the normal forward driving direction causes said upper arm to position said portion outwardly with respect to the vehicle body.

* * * * *